Patented Mar. 13, 1928.

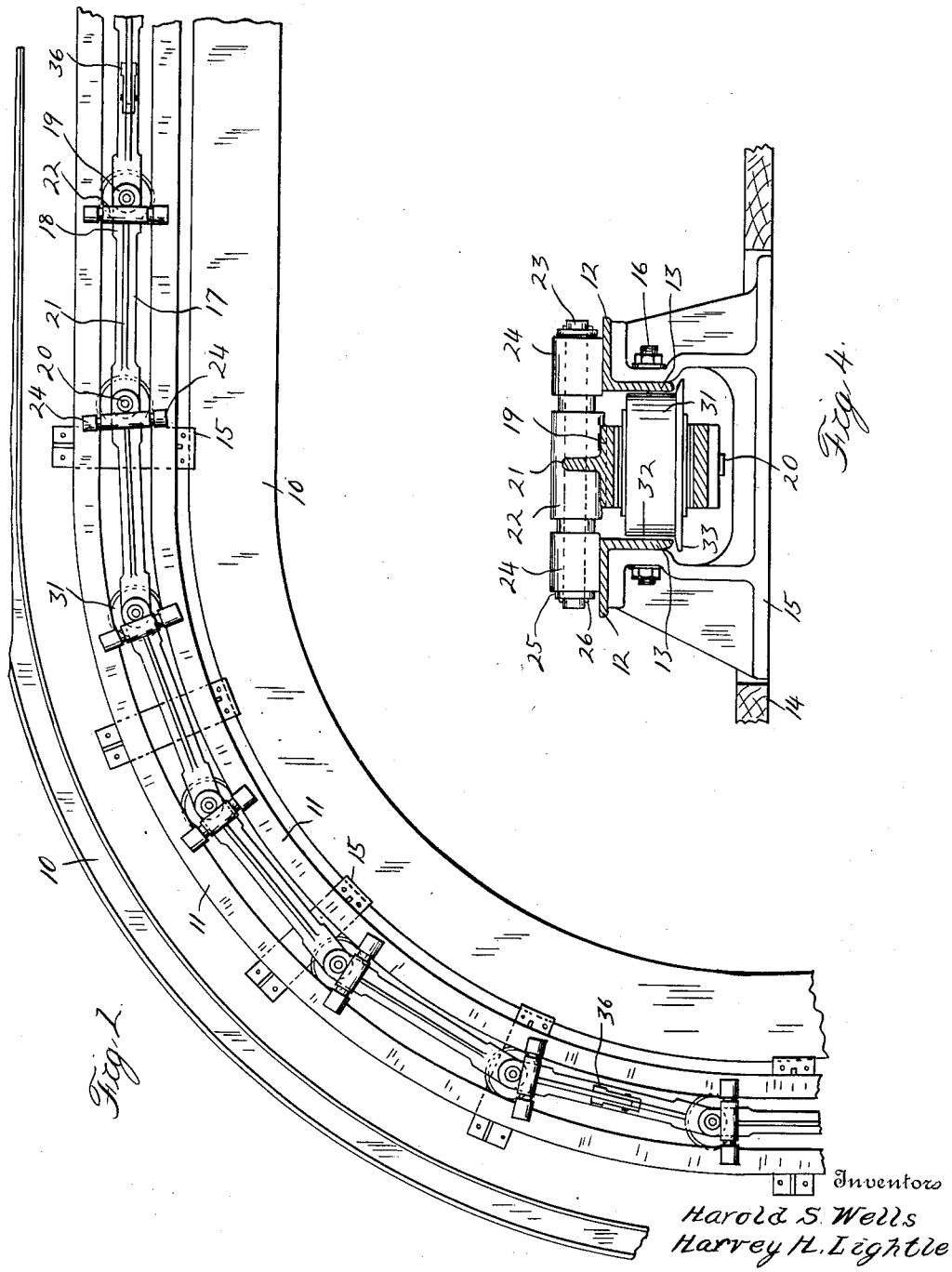

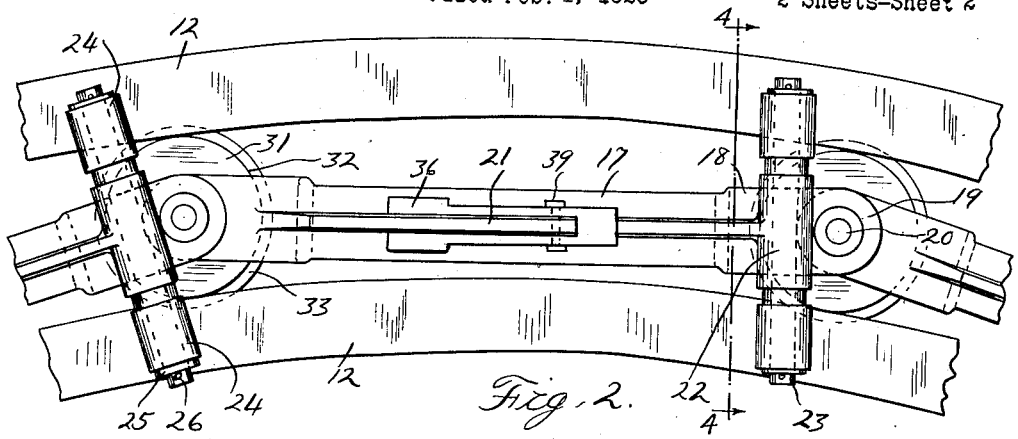
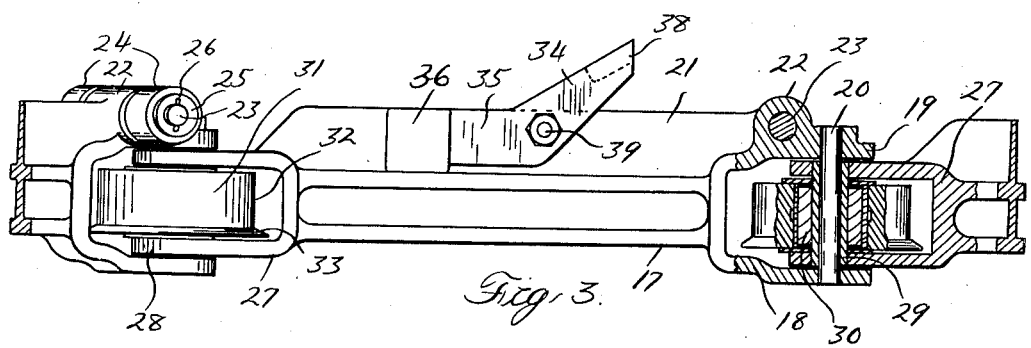
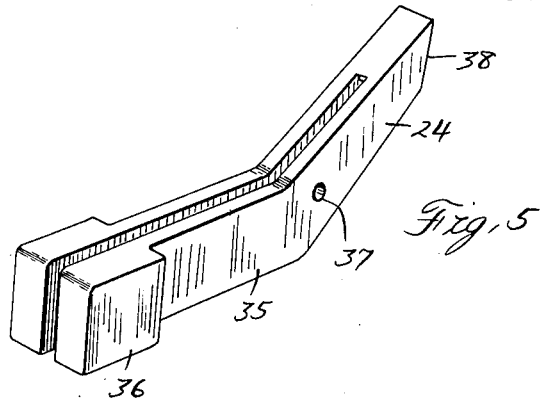

1,662,093

UNITED STATES PATENT OFFICE.

HAROLD S. WELLS AND HARVEY H. LIGHTLE, OF DETROIT, MICHIGAN, ASSIGNORS TO DODGE BROTHERS, INC., OF DETROIT, MICHIGAN, A CORPORATION OF MARYLAND.

CONVEYER-BAR CONSTRUCTION.

Application filed February 1, 1926. Serial No. 85,338.

This invention relates to conveyer bar constructions and more particularly to a conveyer bar construction capable of exerting its working effort on a curve with the operative source of power therefor disaligned with respect to the longitudinal length of the conveyer bar.

The invention finds particular utility in connection with conveyer systems in which it is desired to either continuously or periodically advance an object in a predetermined path of travel and particularly wherein this path of travel is curved, laterally undulated, or in any other manner digresses from a straight line of travel. However, it will be obvious as the description proceeds, that while additional advantages are obtainable by reason of the fact that the puller bar is capable of use in connection with curved conveyer systems nevertheless, numerous advantages are obtained from the use of the conveyer bar in straight conveyer systems.

Other advantages of the invention result from the novel design and details of construction wherein simplicity, and consequently economy in manufacture is obtainable together with durability resulting in commercial practicability as well as efficiency in operation.

The invention has therefore as some of its objects, to simplify, render more efficient and improve generally devices of this character and the above as well as other objects, and advantages will be made more apparent as this description proceeds, especially when considered in connection with the accompanying drawings wherein Figure 1 is a fragmentary plan view of a conveyer bar constructed in accordance with our invention;

Figure 2 is an enlarged fragmentary plan view of the conveyer bar;

Figure 3 is a side elevation, partly in section, of the structure illustrated in Figure 2;

Figure 4 is a transverse sectional view taken substantially on the plane indicated by the line 4—4 in Figure 2; and Figure 5 is a detailed perspective view of one of the dogs employed.

In practice the conveyer system contemplates a conveyer path or path of travel preferably defined by a track or track-ways 10 over which a truck or other movable conveyer, or the article to be conveyed, is moved. It ofttimes occurs that this line of travel cannot be maintained in a straight line and that one or more curves are necessary. In such instances it is essential that a conveyer bar or puller bar, which is designed for imparting the movement to the article being conveyed, be produced which will exert its working effort around the curve or out of longitudinal alignment with the source of power.

In the present instance our conveyer bar is designed to accomplish this and to maintain the bar confined within its predetermined line of travel. Thus, whether the conveyer bar is used in connection with a conveyer system wherein the conveyer bar travels continuously or reciprocates, a single source of power, exerting its efforts at one point in the length of the conveyer bar, removed from the curved portion, will effectively operate or reciprocate the bar throughout its entire length.

In carrying out our invention we associate with the trackways 10 for the truck or article to be moved, a conveyer bar trackway 11 which in the embodiment herein illustrated consists of a pair of angle bars having horizontally arranged flanges 12 and vertically arranged flanges 13. These track members 11 are spaced from the floor line indicated at 14 in Figure 4 by means of frames 15 spaced throughout the length thereof and are preferably secured thereto by means of securing means 16 passed through the vertical flange 13 of each of the track bars and through the supporting members 15. The supporting members 15 are substantially U-shape and as clearly shown in Figure 4 present the rail members of the track spaced vertically above the floor line and laterally from one another for reasons which will appear more fully hereinafter.

The conveyer bar consists essentially of a series of bars or sections 17, with the ends of adjacent sections or bars pivotally or swivelly connected. To accomplish this one end of each bar is provided with a forked or bifurcated portion 18 with the spaced jaws 19 thereof apertured to receive a vertically arranged pivot pin 20. The body of each bar 17 is preferably of a ribbed construction so as to impart thereto the greatest amount of rigidity consistent with the weight and dimensions of the bar. In view of this each bar includes as an element an upstanding rib or flange 21 which unites at the bifurcated end 18 with a transversely arranged apertured enlargement or rounded portion 22. The aperture of this enlargement 22 is adapted to receive a shaft 23 by means of which a pair of rollers 24 are mounted in spaced lateral relation with the bar 17, these rollers being preferably held in place by means of washers 25 and pins 26 extending through the shaft 23. The rollers 24 are adapted to rest upon and have a rolling engagement with the horizontal flanges 12 of the tracks and to prevent a sagging or downward displacement of the conveyer bar.

The end of the next section or bar 17 adjacent the bifurcated end 18 of the bar just described is bifurcated as shown at 27 to provide a pair of spaced jaw members 28 also apertured for the reception of the pin 20. Surrounding this pin and extending between the spaced jaws 28 is a sleeve or bushing 29 engaged by the bearings 30 of a flanged roller 31 rotatably mounted by means of the structure just described. The diameter of the roller 31 is such that the peripheral surface 32 thereof contacts and has a rolling engagement with the vertical flanges 13 of the track bars while the flanged portion 33 thereof engages under the lower edges of the track bars and prevents a vertical displacement of the bar with reference to the trackway.

Obviously, the connection between the adjacent ends of the conveyer bar sections just described is duplicated at the union between the sections throughout the length of the conveyer bar or at least throughout those sections of the conveyer bar employed at the curved portion of the path of travel. The vertical pivot pin 20 permits a lateral pivotal movement of the adjacent conveyer bar sections so as to negotiate curves of practically any radius with which a conveyer bar of this character would be used. Obviously, the length of the conveyer bar sections will be governed somewhat by the radius of the curves, but great latitude in this connection is permissible by reason of the lateral space between the track bars as an increase in the distance between the rails of the track bars would permit a use of a conveyer bar on a more acute curve without decreasing or without shortening the length of the conveyer bar sections. Obviously in such an instance the diameter of the flanged roller 31 would be correspondingly increased.

While it is apparent that various types of dogs or like members may be mounted upon the conveyer bar for engaging the work during the movement of the conveyer bar, nevertheless, we have disclosed herein one particular type of dog which we find to embody particular merit and special advantages because of its simplicity of construction which enables it to be cheaply manufactured and easily installed.

This particular type of dog is illustrated in Figure 5 and is adapted to be mounted upon the upstanding rib 21 of the conveyer bar sections. Obviously, the spacing of these dogs and consequently the number associated with the conveyer bar will depend upon the conditions of use and will be governed largely by the size of the articles to be conveyed and by the desired capacity of the conveying bar. As seen in Figure 5, each dog consists of an integral construction angular in side elevation having an upstanding portion 34 and a relatively horizontal portion 35 which is bifurcated so as to straddle the upstanding rib 21. The extremities of the portion 35 are preferably weighted as at 36 so as to maintain the dog, which is pivoted to the rib 21 by means of a pin passing through aligned apertures 37, in a position wherein the angular portion 34 and consequently the face 38 is in position to engage the work. From the construction it will be readily apparent that when the dog is used in connection with a reciprocating conveyer bar that movement of the conveyer bar in one direction will cause a pivoting movement of a dog whereupon the end 34 thereof will be depressed to clear the work and to position the dog behind a new work piece in the customary manner. As shown in Figure 3 a bolt 39 is passed through the aligned opening 37 of the dog and through a corresponding aperture in the rib 21 so that the dog is removably mounted and may be replaced, removed or rearranged as found necessary and expedient. It is understood that while in many cases systems of this character contemplate the use of trucks upon which the work is mounted and that in such instances the dogs or other work engaging means engage the frame or other projections on the truck, nevertheless these dogs may be employed with equal effectiveness where they engage directly against the work.

The construction of conveyer bar herein described and illustrated is capable of receiving and effectively transmitting throughout its length both push and pull movements without any disastrous or appreciable loss of power. The flanged rollers 31 act as thrust bearings for absorbing and minimizing lateral thrusts imparted to the conveyer bar by reason of the direction of projection of the power with reference to the curvature of the track and the horizontally arranged rollers cooperate therewith for minimizing frictional resistance resulting from extended lengths of conveyer bars. Consequently, a maximum efficiency is obtainable in view of the fact that but one power unit need be associated with unusually long lengths of conveyer bars. Furthermore, the rollers 24 bearing upon the upper surfaces of the track way and the flange of the roller 31 engaging the lower edge of the track way, cooperate not only to prevent sagging of an extended length of conveyer bar but prevent buckling thereof because of excessive compressive forces exerted thereupon.

To those skilled in this particular art obvious structural changes, modifications and rearrangements will suggest themselves and reservation is made to make such changes as these as may come within the purview of the accompanying claims.

What we claim as our invention is:

1. In a conveyer bar construction, the combination with a track-way of two pivotally connected conveyer bar sections and means carried thereby and embracing said track-way for preventing lateral or vertical displacement of said conveyer bar.

2. In a conveyer bar construction, the combination with a curved track-way of two conveyer bar sections having lateral pivotal connection, and means carried thereby and embracing said track-way for preventing relative lateral or vertical displacement of said conveyer bar.

3. In a conveyer bar construction, the combination with a track-way, of two conveyer bar sections, means connecting said sections for lateral pivotal movement, and means carried by said sections and guidingly embracing said track-way.

4. In a conveyer bar construction, the combination with a trackway, of two conveyer bar sections, means connecting adjacent ends of said sections permitting lateral pivotal movement, and anti-friction guiding means carried by said sections and embracing said trackway.

5. In a conveyer bar construction, the combination with a trackway, of two conveyer bar sections, means connecting adjacent ends of said sections permitting lateral pivotal movement, and guiding means carried by said sections at their point of pivotal connection for embracing said trackway.

6. In a conveyer bar construction, the combination with a trackway of two pivotally connected conveyer bar sections, means carried thereby and embracing said trackway for preventing lateral or vertical displacement of said conveyer bar, and a work engaging element on one of said conveyer bar sections.

7. In a conveyer bar construction, the combination with a curved trackway of two conveyer bar sections having lateral pivotal connection, means carried thereby and engaging said trackway for preventing relative lateral or vertical displacement of said conveyer bar, an upstanding ridge on the conveyer bar and a work engaging element pivotally mounted on said ridge.

8. In a conveyer bar construction, the combination with a trackway, of two conveyer bar sections, means connecting said sections for lateral pivotal movement, means carried by said sections and guidingly engaging said trackway, and a work engaging dog pivotally mounted on one of said conveyer bar sections, the said work engaging dog being movable by gravity into operative position and limited in its pivotal movement by the said conveyer bar section.

9. In a conveyer bar construction for use on curves, a curved trackway including spaced angle bars, a plurality of conveyer bar sections, means pivotally connecting the adjacent ends of said sections for relative lateral movement, means for preventing vertical displacement of said sections, and lateral thrust members engaging said trackway and carried by said conveyer bar at the point of pivotal connection of said sections.

10. In a conveyer bar construction for use on curves, a curved trackway including spaced angle bars, a plurality of conveyer bar sections, means pivotally connecting the adjacent ends of said sections for relative lateral movement, means for preventing vertical displacement of said sections, and thrust members carried by said conveyer bar and engaging said track to absorb lateral thrusts.

11. In a conveyer bar construction for use in connection with curved trackways, a curved trackway comprising a pair of spaced angle bars, a plurality of conveyer bar sections pivotally connected at adjacent ends, and laterally extending anti-friction members carried by said sections and engaging said trackway for suspending said conveyer bar therefrom.

12. In a conveyer bar construction for use in connection with curved trackways, a curved trackway comprising a pair of spaced angle bars, a plurality of conveyer bar sections pivotally connected at their adjacent ends, means carried by said sections at their point of pivotal connection and engaging said spaced track bars for preventing lateral displacement of said conveyer bar, and additional means for preventing vertical displacement thereof.

13. In a conveyer bar construction for use in connection with curved trackways, a curved trackway comprising spaced track bars, a plurality of conveyer bar sections pivotally connected at adjacent ends, flanged rollers carried by said sections at their point of pivotal connection and engaging said track bars for absorbing lateral thrusts, the said flange engaging under said track bars and cooperating therewith for preventing vertical displacement of said conveyer bar sections.

14. In a conveyer bar construction, the combination with an angle bar track member, of a conveyer bar, and means carried by the said conveyer bar and engaging a face and an edge of the said angle bar track member for preventing lateral or vertical displacement of the said conveyer bar.

15. In a conveyer bar construction, the combination with an angle bar track member, of a conveyer bar, and a roller carried by the said conveyer bar engaging a face and an edge of the said angle bar track member.

16. The combination in a conveyer bar construction of a trackway including a pair of angle bars each having a horizontally arranged flange and a vertically arranged flange, a conveyer bar between the said angle bars, and means carried by the conveyer bar and engaging the upper faces and the lower edges of the said angle bars for guiding the said conveyer bar.

17. In a conveyer bar construction, the combination with an angle bar track member, of a conveyer bar, a roller carried by the conveyer bar engaging one face and the lower edge of the said angle bar, and a second roller carried by the said conveyer bar engaging the upper face of the said angle bar.

In testimony whereof we affix our signatures.

HAROLD S. WELLS.
HARVEY H. LIGHTLE.